(12) United States Patent
Lee (10) Patent No.: US 12,124,652 B2
(45) Date of Patent: Oct. 22, 2024

(54) TOUCH DISPLAY PANEL AND DRIVE METHOD THEREFOR

(71) Applicant: Wuhan Tianma Microelectronics Co., Ltd., Wu han (CN)

(72) Inventor: Byungjun Lee, Wuhan (CN)

(73) Assignee: WUHAN TIANMA MICROELECTRONICS CO., LTD., Wuhan (CN)

( * ) Notice: Subject to any disclaimer, the term of this patent is extended or adjusted under 35 U.S.C. 154(b) by 0 days.

(21) Appl. No.: 18/110,387

(22) Filed: Feb. 16, 2023

(65) Prior Publication Data

US 2024/0211072 A1   Jun. 27, 2024

(30) Foreign Application Priority Data

Dec. 27, 2022   (CN) .......................... 202211680986.2

(51) Int. Cl.
*G06F 3/041* (2006.01)
*G06F 3/044* (2006.01)

(52) U.S. Cl.
CPC .......... *G06F 3/0418* (2013.01); *G06F 3/0443* (2019.05); *G06F 3/0446* (2019.05); *G06F 3/0448* (2019.05); *G06F 2203/04111* (2013.01)

(58) Field of Classification Search
None
See application file for complete search history.

(56) References Cited

U.S. PATENT DOCUMENTS

2019/0102015 A1*   4/2019   Kim .................... H10K 50/82

FOREIGN PATENT DOCUMENTS

| CN | 104793799 A | 7/2015 |
| CN | 109121399 A | 1/2019 |
| CN | 110609636 A | 12/2019 |

* cited by examiner

*Primary Examiner* — Stephen T. Reed
(74) *Attorney, Agent, or Firm* — East IP P.C.

(57) ABSTRACT

The application discloses a touch display panel and a drive method therefor. Touch display panel includes a drive electrode, an induction electrode, a detection electrode and an operational amplifier, wherein the induction electrode is electrically connected with a first input terminal of the operational amplifier, and the detection electrode is electrically connected with a second input terminal of the operational amplifier, and wherein the operational amplifier is configured to perform a difference operation between a signal received by the second input terminal and a signal received by the first input terminal.

18 Claims, 10 Drawing Sheets

TOUCH DISPLAY PANEL AND DRIVE METHOD THEREFOR

CROSS REFERENCE TO RELATED APPLICATION

This application claims priority to Chinese Patent Application No. 202211680986.2, filed on Dec. 27, 2022, which is hereby incorporated by reference in its entirety.

TECHNICAL FIELD

This application relates to a field of touch display technology, and particularly to a touch display panel and a drive method therefor.

BACKGROUND

Nowadays, a capacitance induction recognition system is widely used in a human-computer interaction application such as a projection capacitive touch screen, a touch pad and a fingerprint recognition, and its principle is to convert a capacitance value induced by an induction electrode into an electrical signal (a voltage signal, a current signal or the like). For a touch screen application, a pressing of a finger will cause a change on a magnitude of an induced capacitance at a corresponding position, and then a magnitude of a detected electrical signal will be correspondingly different from that without touch, and thus whether a touch occurs and its position information will be determined.

However, when detecting a touch point, there is an interference signal that affect the accuracy of touch recognition.

SUMMARY

Embodiments of this application provides a touch display panel and a drive method therefor.

In an aspect, the embodiments of the present application provide a touch display panel including a drive electrode, an induction electrode, a detection electrode and an operational amplifier, wherein the induction electrode is electrically connected with a first input terminal of the operational amplifier, and the detection electrode is electrically connected with a second input terminal of the operational amplifier, and wherein the operational amplifier is configured to perform a difference operation between a signal received by the second input terminal and a signal received by the first input terminal.

In another aspect, the embodiments of the application provide a drive method for a touch display panel, wherein the touch display panel includes a drive electrode, an induction electrode, a detection electrode and an operational amplifier, wherein the induction electrode is electrically connected with a first input terminal of the operational amplifier, and the detection electrode is electrically connected with a second input terminal of the operational amplifier, and wherein the operational amplifier is configured to perform a difference operation between a signal received by the second input terminal and a signal received by the first input terminal. The method includes: in a first time period, providing a drive signal to the drive electrode, transmitting a signal induced by the induction electrode to the first input terminal of the operational amplifier, and controlling the detection electrode to be in a non-operation state; in a second period, transmitting a signal induced by the detection electrode to the second input terminal of the operational amplifier, and controlling the drive electrode to be in a non-operation state; and performing the difference operation between the signal received by the second input terminal and the signal received by the first input terminal to remove an interference signal induced by the induction electrode and the detection electrode to obtain a touch induction signal.

BRIEF DESCRIPTION OF THE DRAWINGS

Other features, objects and advantages of the present application will become more apparent upon reading the following detailed description of non-limiting embodiments with reference to the accompanying drawings, wherein the same or similar reference numbers denote the same or similar features, and the figures are not drawn to actual scale.

DETAILED DESCRIPTION

The features and exemplary embodiments of various aspects of the present application will be described in detail below. In order to make the purpose, technical solutions and advantages of the present application more clear, the present application will be further described in detail below with reference to the accompanying drawings and specific embodiments. It should be understood that the specific embodiments described herein are only configured to explain the present application, and are not configured to limit the present application. It will be apparent to those skilled in the art that the present application may be practiced without some of these specific details. The following description of the embodiments is merely to provide a better understanding of the present application by illustrating examples of the present application.

It should be noted that, relational terms such as first and second herein are used only to distinguish one entity or operation from another entity or operation, and do not necessarily require or imply that any such relationship or sequence actually exists among these entities or operations.

In addition, the terms "include", "comprise" or any other variation thereof are intended to encompass non-exclusive inclusion, such that a process, method, article or device which includes a list of elements includes not only those elements, but also other elements which are not explicitly listed or elements inherent to such process, method, article or device. Without further limitation, an element defined by the phrase "include" does not preclude the presence of additional identical elements in the process, method, article, or device that includes the element.

It will be understood that, in describing a structure of a component, when a layer or area is referred to as being "on" or "over" another layer or area, it may refer to that the layer or area is directly on the another layer or area, or other layer or area is further included between the layer or area and the another layer or area. Further, if the component is turned over, the layer or area will be "below" or "beneath" the another layer or area.

It should be understood that the term "and/or" used in this document is only to describe an association relationship of associated objects, which indicates that there may be three kinds of relationships. For example, A and/or B may indicate three cases of A existing alone, A and B existing at the same time, and B existing alone. In addition, the character "/" herein generally indicates that related objects have an "or" relationship.

In the embodiments of the present application, the term "connection" may refer to a direct connection of two components, or may refer to a connection between the two components via one or more other components.

It will be apparent to those skilled in the art that various modifications and variations may be made in the present application without departing from the spirit or scope of the present application. Thus, the present application is intended to cover the modifications and variations of the present application that fall within the scope of the corresponding claims (claimed technical solutions) and their equivalents. It should be noted that the implementation manners provided by the embodiments of the present application may be combined with one another if there is no contradiction.

Before describing the technical solutions provided by the embodiments of the present application, in order to facilitate the understanding of the embodiments of the present application, the present application specifically describes the problems existed in the prior art first.

A touch display panel has display and touch functions, and a touch point needs to be recognized in a process of display, in order to realize human-computer interaction. The touch display panel may include signal routings and components to drive a display screen of the touch display panel. The touch display panel may further include a drive electrode and an induction electrode, and whether a touch occurs and its position information is determined by a magnitude of an induced capacitance at a corresponding position.

However, the inventor found through research that in a process of driving the display of the touch display panel, an interference signal will be generated, which affects an accuracy of touch recognition.

To solve the above technical problem, the embodiments of this application provide a touch display panel and a drive method therefor. The following will describe respective embodiments of the touch display panel and the drive method therefor in combination with the drawings.

Figure 1:
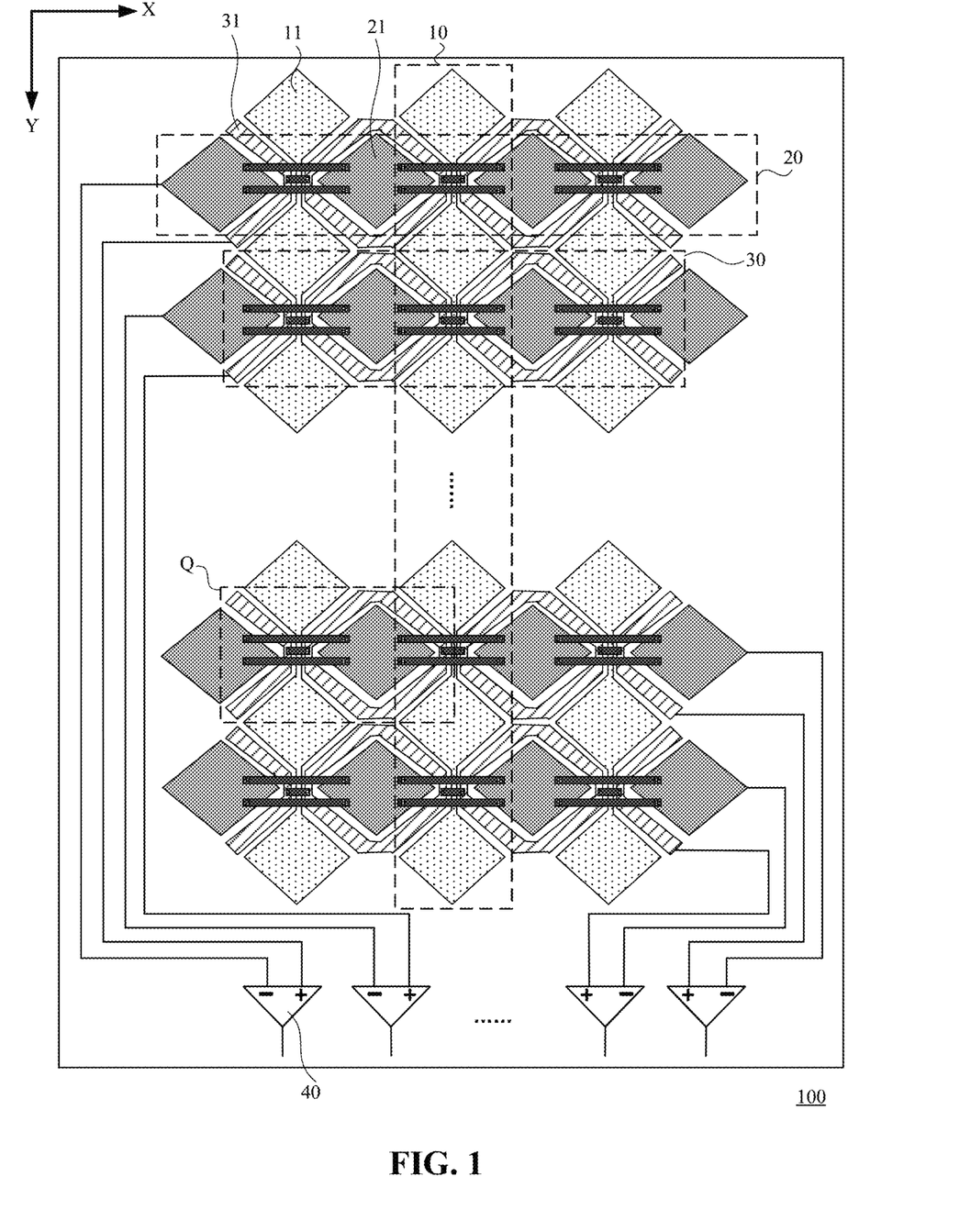
FIG. 1 shows a schematic top view of a structure of a touch display panel provided by the embodiments of the application.

FIG. 1 shows a schematic top view of a structure of a touch display panel provided by the embodiments of the application. As shown in FIG. 1, the touch display panel 100 provided by the embodiments of the present application may include a drive electrode 11, an induction electrode 21, a detection electrode 31 and an operational amplifier 40. The induction electrode 21 may be electrically connected with a first input terminal of the operational amplifier 40, and the detection electrode 31 may be electrically connected with a second input terminal of the operational amplifier 40. The operational amplifier 40 may be configured to perform a difference operation between a signal received by the second input terminal and a signal received by the first input terminal.

One of the first input terminal and the second input terminal is an inverting input terminal (−), and the other is a non-inverting input terminal (+). In the drawings, the first input terminal is the inverting input terminal (−), and the second input terminal is the non-inverting input terminal (+), which is an example and not used for limiting the application. It should be understood that a polarity of a signal at the inverting input terminal (−) is opposite to a polarity of a signal at an output terminal of the operational amplifier 40, and a polarity of a signal at the non-inverting input terminal (+) is the same as the polarity of the signal at the output terminal of the operational amplifier 40.

According to the touch display panel and the drive method therefor provided by the embodiments of the application, a mutual capacitance may be formed between the induction electrode 21 and the drive electrode 11, and the signal induced by the induction electrode 21 may include a touch signal and an interference signal. The detection electrode 31 and the drive electrode 11 may operate in different time periods, and a mutual capacitance may not be formed between the detection electrode 31 and the drive electrode 11, so that a signal induced by the detection electrode 31 includes an interference signal and does not include a touch signal. The signal induced by the induction electrode 21 is transmitted to the first input terminal of the operational amplifier 40, and the signal induced by the detection electrode 31 is transmitted to the second input terminal of the operational amplifier 40. The operational amplifier 40 performs the difference operation between the signal received by the second input terminal and the signal received by the first input terminal, which may remove the common interference signal between the signal induced by the induction electrode 21 and the signal induced by the detection electrode 31, and is beneficial to improve the accuracy of touch recognition.

Each of the signal induced by the induction electrode 21 and the signal induced by the detection electrode 31 may include the interference signal caused by driving the touch display panel to display, so that each of the signal received by the first input terminal of the operational amplifier 40 and the signal received by the second input terminal includes the interference signal caused by the display. In this way, the operational amplifier 40 performs the difference operation between the signal received by the second input terminal and the signal received by the first input terminal, which may remove the common interference signal, between the signal induced by the induction electrode 21 and the signal induced by the detection electrode 31, caused by the common display, to reduce the affection of the interference caused by the display on the accuracy of touch recognition.

Some switching elements are existed in a display area of the touch display panel and a drive chip of the touch display panel. When driving the display of the touch display panel, it is necessary to control the switching elements to be switched between turn-on and turn-off states. The inventor found through research that when switching the switching elements, an interference signal with respect to the induction electrode 21 will be generated. In addition, loads of the signal routings of the touch display panel are different, and parasitic capacitances with respect to the induction electrode 21 are different, such that an interference signal with respect to the induction electrode 21 will be generated by the load difference among signal routings of the touch display panel.

Alternatively, the interference signal caused by driving the touch display panel for display may include one or more of the interference signal generated by the operation of the switching element in the display area of the touch display panel, the interference signal generated by the operation of the switching element in the drive chip of the touch display panel, and the interference signal generated by the load difference among signal routings of the touch display panel.

Figure 2:
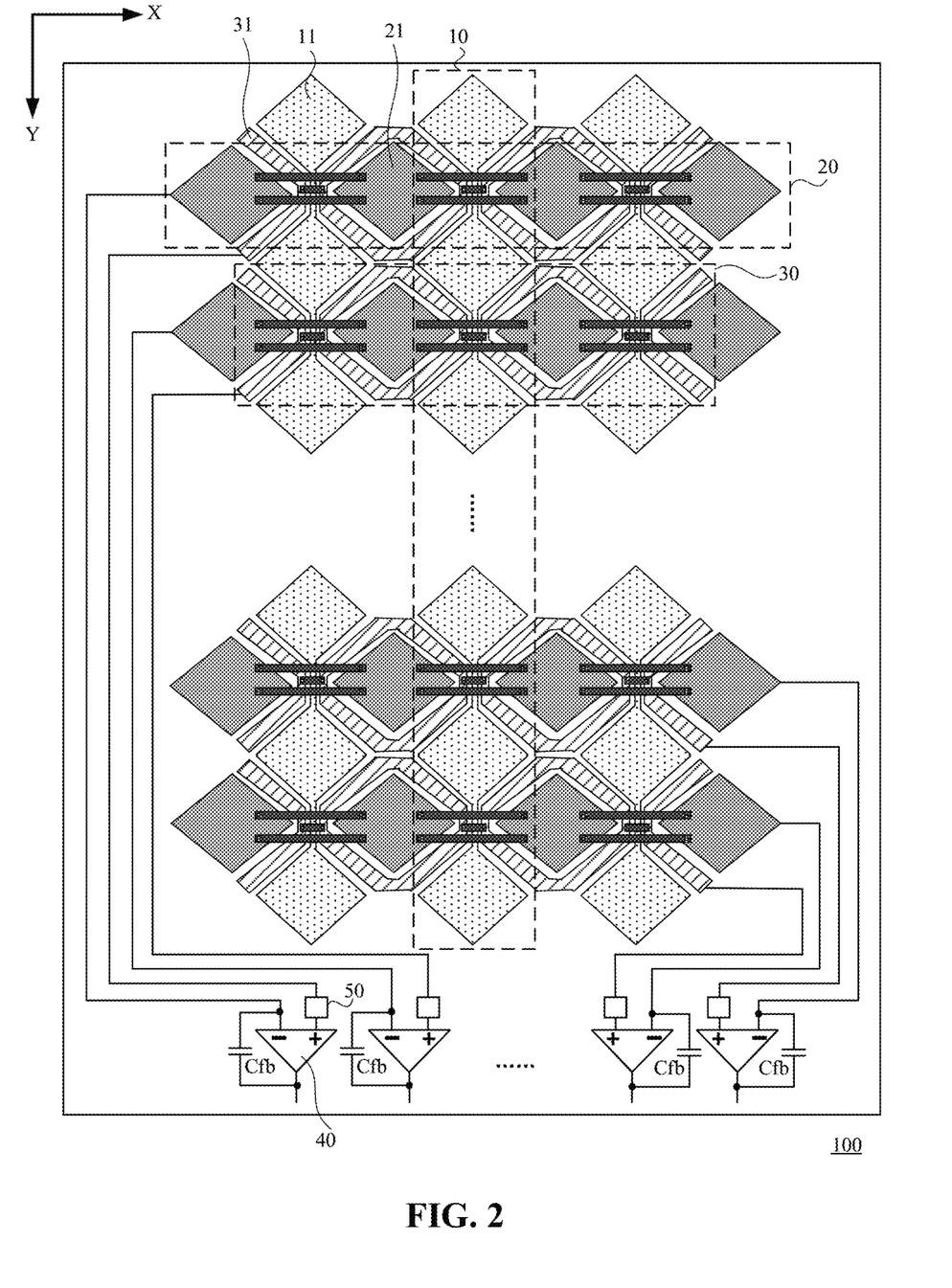
FIG. 2 shows a schematic top view of another structure of a touch display panel provided by the embodiments of the application.

A cross-sectional area of the induction electrode 21 may affect a magnitude of a signal induced thereby, and a cross-sectional area of the detection electrode 31 may also affect a magnitude of signal induced thereby. In order to further avoid the signal output by the operational amplifier 40 including the interference signal, the touch display panel may further include a gain adjustment unit 50 as shown in FIG. 2. The gain adjustment unit 50 may be configured to increase or decrease a signal. In addition, since the signal induced by the detection electrode 31 may only include the interference signal, the gain adjustment unit 50 may be electrically connected between the detection electrode 31 and the second input terminal of the operational amplifier 40. In this way, the gain adjustment unit 50 may be configured to adjust the signal induced by the detection electrode 31 according to a difference between the cross-sectional area of the detection electrode 31 and the cross-sectional area of the induction electrode 21.

As long as the gain adjustment unit 50 may adjust the magnitude of the signal, the specific structure of the gain adjustment unit 50 is not limited in the application.

Figure 4:
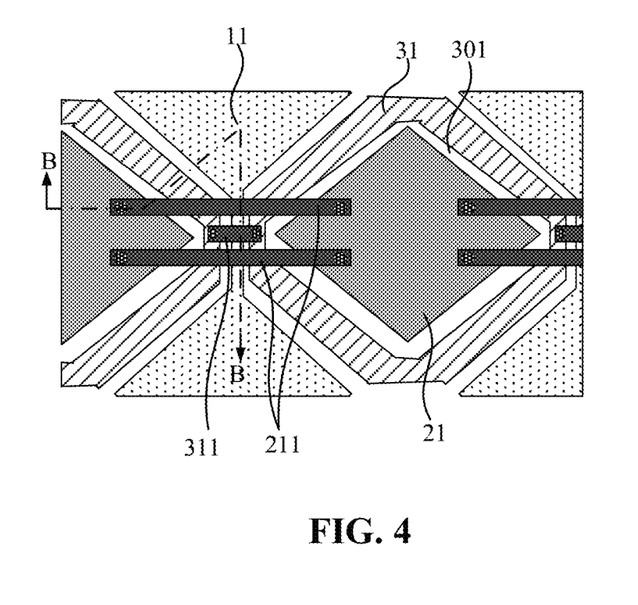
FIG. 4 shows an enlarged schematic diagram of an area Q in FIG. 1.

As an example, the cross-sectional area of the induction electrode 21 may be an area of a cross-section of the induction electrode 21 parallel to a light-emitting surface of the touch display panel, and the cross-sectional area of the detecting electrode 31 may be an area of a cross-section of the detecting electrode 31 parallel to the light-emitting surface of the touch display panel. For example, as shown in FIG. 4, the cross-section of the induction electrode 21 parallel to the light-emitting surface of the touch display panel may be a rhombus, and the cross-sectional area of the induction electrode 21 may be an area of the rhombus. The cross-section of the detection electrode 31 parallel to the light-emitting surface of the touch display panel may be an annulus, and the cross-sectional area of the detection electrode 31 may be an area of the annulus.

A magnitude of the signal induced by the induction electrode 21 may be positively correlated with its cross-sectional area, and a magnitude of the signal induced by the detection electrode 31 may also be positively correlated with its cross-sectional area. As an example, the cross-sectional area of the induction electrode 21 may be larger than the cross-sectional area of the detection electrode 31, and the gain adjustment unit 50 may be configured to increase the signal induced by the detection electrode 31. As another example, the cross-sectional area of the induction electrode 21 may be smaller than the cross-sectional area of the detection electrode 31, and the gain adjustment unit 50 may be configured to reduce the signal induced by the detection electrode 31.

For example, a ratio of the cross-sectional area of the induction electrode 21 to the cross-sectional area of the detection electrode 31 is a. When a is greater than 1, the gain adjustment unit 50 may be configured to increase the signal induced by the detection electrode 31 by a times. When a is less than 1, the gain adjustment unit 50 may be configured to decrease the signal induced by the detection electrode 31 by a times. In this way, the signal induced by the detection electrode 31 and adjusted by the gain adjustment unit 50 is the same as the interference signal induced by the induction electrode 21.

As an example, the cross-sectional area of the induction electrode 21 may be equal to an area of an orthographic projection of the induction electrode 21 on the light-emitting surface of the touch display panel, and the cross-sectional area of the detection electrode 31 may be equal to an area of an orthographic projection of the detection electrode 31 on the light-emitting surface of the touch display panel.

Obviously, under a condition that the cross-sectional area of the induction electrode 21 is equal to the cross-sectional area of the detection electrode 31, the gain adjustment unit 50 may not be arranged, or the gain adjustment unit 50 may be configured to keep the signal induced by the detection electrode 31 unchanged.

In some alternative embodiments, as shown in FIG. 2, the touch display panel may further include a first capacitor Cfb. A first electrode of the first capacitor Cfb is connected with the first input terminal of the operational amplifier 40, and a second electrode of the first capacitor Cfb is connected with the output terminal of the operational amplifier 40.

Figure 3:
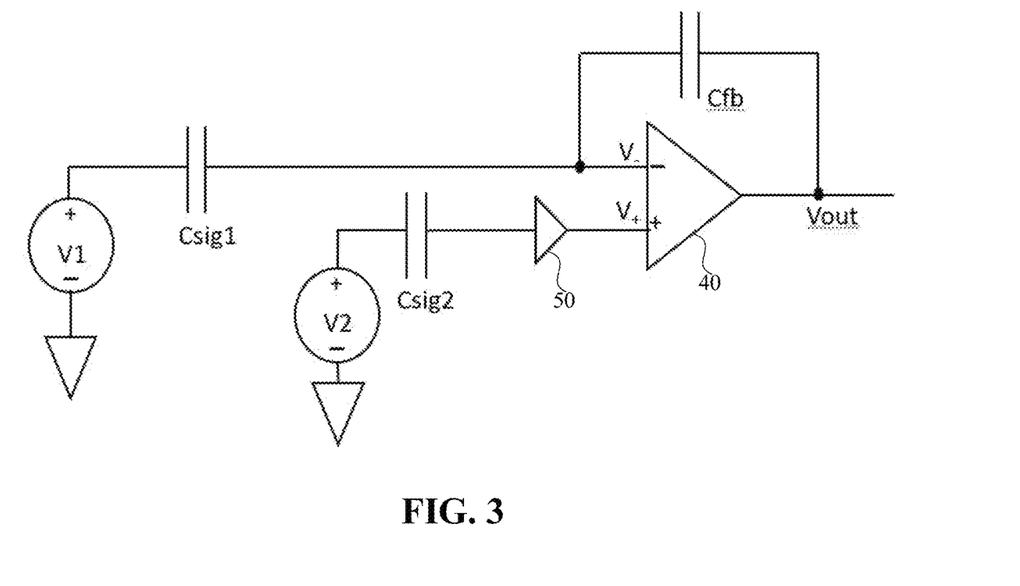
FIG. 3 shows an schematic diagram of an equivalent circuit structure of the structure shown in FIG. 2.

As shown in FIG. 3, the output signal of the output terminal of the operational amplifier 40 is Vout, Vout=A (V+−V−), V− is the signal received by the first input terminal of the operational amplifier 40, V+ is the signal received by the second input terminal of the operational amplifier 40, A=Csig1/Cfb, Csig1 is a capacitance value induced by the induction electrode 21, Csig2 is a capacitance value detected by the detection electrode 31, V1 is a drive signal provided to the drive electrode, V2 may be the interference signal generated by driving the touch display panel to display, and V2 may not be a voltage signal.

By arranging the first capacitor Cfb, the magnitude of the induced signal generated by the induction electrode 21 may be adjusted, and the signal may be output through the output terminal of the operational amplifier 40.

Alternatively, the signal output through the output terminal of the operational amplifier 40 may be further transmitted to a sampling and holding circuit, an integration circuit, an analog-to-digital converter (ADC) and (or) other circuits to convert the induced capacitance value into a digital signal to realize a recognition of a touch point and a touch operation.

Please continue to refer to FIG. 1 or FIG. 2, a plurality of drive electrodes 11 may constitute a plurality of drive channels 10, and a plurality of drive electrodes 11 of each drive channel 10 are connected with one another. A plurality of induction electrodes 21 may constitute a plurality of induction channels 20, a plurality of induction electrodes 21 of each induction channel 20 are connected with one another, and the induction channels 20 intersect with the drive channels 10. A plurality of detection electrodes 31 may constitute a plurality of detection channels 30, a plurality of detection electrodes 31 of each detection channel 30 are connected with one another, and the detection channels 30 intersect with the drive channels 10.

For example, the induction channel 20 may extend in a first direction X, and the plurality of the induction channels 20 are arranged in a second direction Y. The drive channel 10 may extend in the second direction Y, and the plurality of the drive channels 10 are arranged in the first direction X.

The first direction X may be a row direction, and the second direction Y may be a column direction. Obviously, the row direction and the column direction may also be interchanged. The extension direction of the detection channel 30 may be the same as the extension direction of the induction channel 20.

Alternatively, the drive electrodes 11, the induction electrodes 21 and the detection electrodes 31 may be located in the display area of the touch display panel. The operational amplifier 40, the gain adjustment unit 50 and the first capacitor Cfb may be located in the non-display area of the touch display panel. The touch display panel may include a touch drive chip. The operational amplifier 40, the gain adjustment unit 50, and the first capacitor Cfb may be arranged on the touch drive chip.

Figure 5:
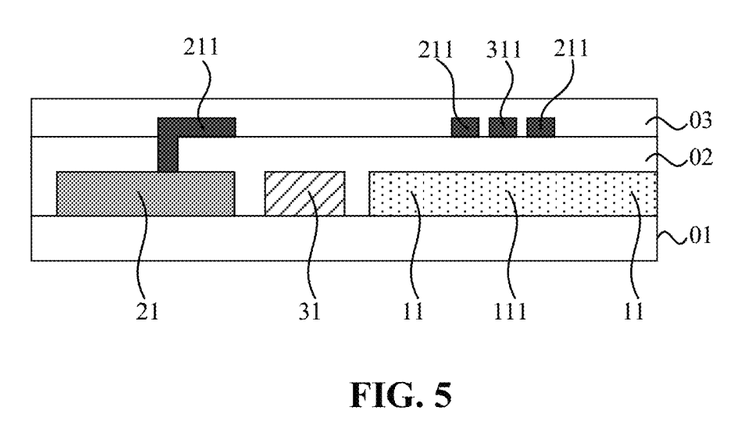
FIG. 5 shows a schematic cross-section view along B-B of the structure in FIG. 4.

In some alternative embodiments, as shown in FIG. 4 and FIG. 5, the drive electrodes 11, the induction electrodes 21 and the detection electrodes 31 may be located in a same film layer. Since the induction electrodes 21 and the detection electrodes 31 are located in the same film layer, a distance between the induction electrodes 21 and a component that generates the interference signal due to the driving of the display and a distance between the detection electrode 31 and the component will tend to be consistent, and the interference signals induced by the induction electrode 21 and the detection electrode 31 will also tend to be consistent, which is further beneficial to remove the common interference signal induced by the induction electrode 21 and the detection electrode 31.

Materials of the drive electrode 11, the induction electrode 21 and the detection electrode 31 may be the same, so that the drive electrode 11, the induction electrode 21 and the detection electrode 31 may be formed simultaneously in a same process step.

As an example, the materials of the drive electrode 11, the induction electrode 21 and the detection electrode 31 may include a transparent conductive material, such as an indium tin oxide (ITO).

In some alternative embodiments, under a condition that the drive electrodes 11, the induction electrodes 21 and the detection electrodes 31 are located in the same film layer, as shown in FIG. 5, the plurality of detection electrodes 31 of a same detection channel 30 are connected through a first bridge structure(s) 311; and electrodes of at least one of the drive channel 10 and the induction channel 20 are connected through at least one second bridge structure. In the figures of the present application, it is shown that a plurality of induction electrodes 21 of the induction channel 20 are connected through the second bridge structure 211, which is not used for limiting the present application. A plurality of drive electrodes 11 of each drive channel 10 may be connected through a connection part(s) 111, the connection part 111 and the drive electrode 11 may be located in a same film layer, and the materials of the connection part 111 and the drive electrode 11 may be the same.

The first bridge structure 311 and the detection electrode 31 are located in different film layers, and the first bridge structure 311 may be connected with the detection electrode 31 through via. The second bridge structure 211 and the induction electrode 21 are located in different film layers, and the second bridge structure 211 may be connected with the induction electrode 21 through via.

As an example, please continue to refer to FIG. 5, the touch display panel may include a substrate 01, and the drive electrode 11, the induction electrode 21 and the detection electrode 31 are on one side of the substrate 01. The first bridge structure 311 and the second bridge structure 211 are on a side of the electrodes facing away from the substrate 01. The first bridge structure 311 and the second bridge structure 211 may be located in a same film layer. The materials of the first bridge structure 311 and the second bridge structure 211 may also be the same. An insulating layer 02 may be included between the film layer where the first bridge structure 311 and the second bridge structure 211 are located and the film layer where the electrodes are located. A protective layer 03 may cover the first bridge structure 311 and the second bridge structure 211.

In some alternative embodiments, an extension direction of the first bridge structure 311 and an extension direction of the second bridge structure 211 may be the same. An extension direction of the detection channel 30 may be the same as an extension direction of the induction channel 20.

The electrodes of at least one of the drive channel 10 and the induction channel 20 are connected through two second bridge structures 211, and the first bridge structure 311 is between the two second bridge structures 211. The two second bridge structures 211 have a relationship of parallel connection, which may reduce an impedance of the second bridge structures 211. Under a condition that the second bridge structures 211 are connected with the induction electrode 21, since both the induction electrode 21 and the detection electrode 31 may induce the interference signal caused by the display, arranging the first bridge structure 311 between the two second bridge structures 211 may reduce a coupling between the first bridge structure 311 and other components, and improve a stability of a signal transmitted by the first bridge structure 311.

As an example, the plurality of induction electrodes 21 of a same induction channel 20 may be connected with ta same operational amplifier 40, and different induction channels 20 may be connected with different operational amplifiers 40.

The plurality of detection electrodes 31 of a same detection channel 30 may be connected with a same operational amplifier 40, and different detection channels 30 may be connected with different operational amplifiers 40. Alternatively, under a condition that the number of the detection channels 30 is greater than the number of the induction channels 20, a plurality of detection channels 30 may be connected with a same second input terminal of an operational amplifier 40.

Please refer to FIG. 1 and FIG. 4, at least one of the induction channels 20 is correspondingly provided with a detection channel 30. As an example, the induction channels 20 and the detection channels 30 may be arranged to have a one-to-one correspondence. As shown in FIG. 4, each detection electrode 31 includes a first hollow area 301, and each induction electrode 21 is located in the first hollow area 301 of a corresponding detection electrode 31. In other words, the detection electrode 31 may surround the induction electrode 21.

Figure 6:
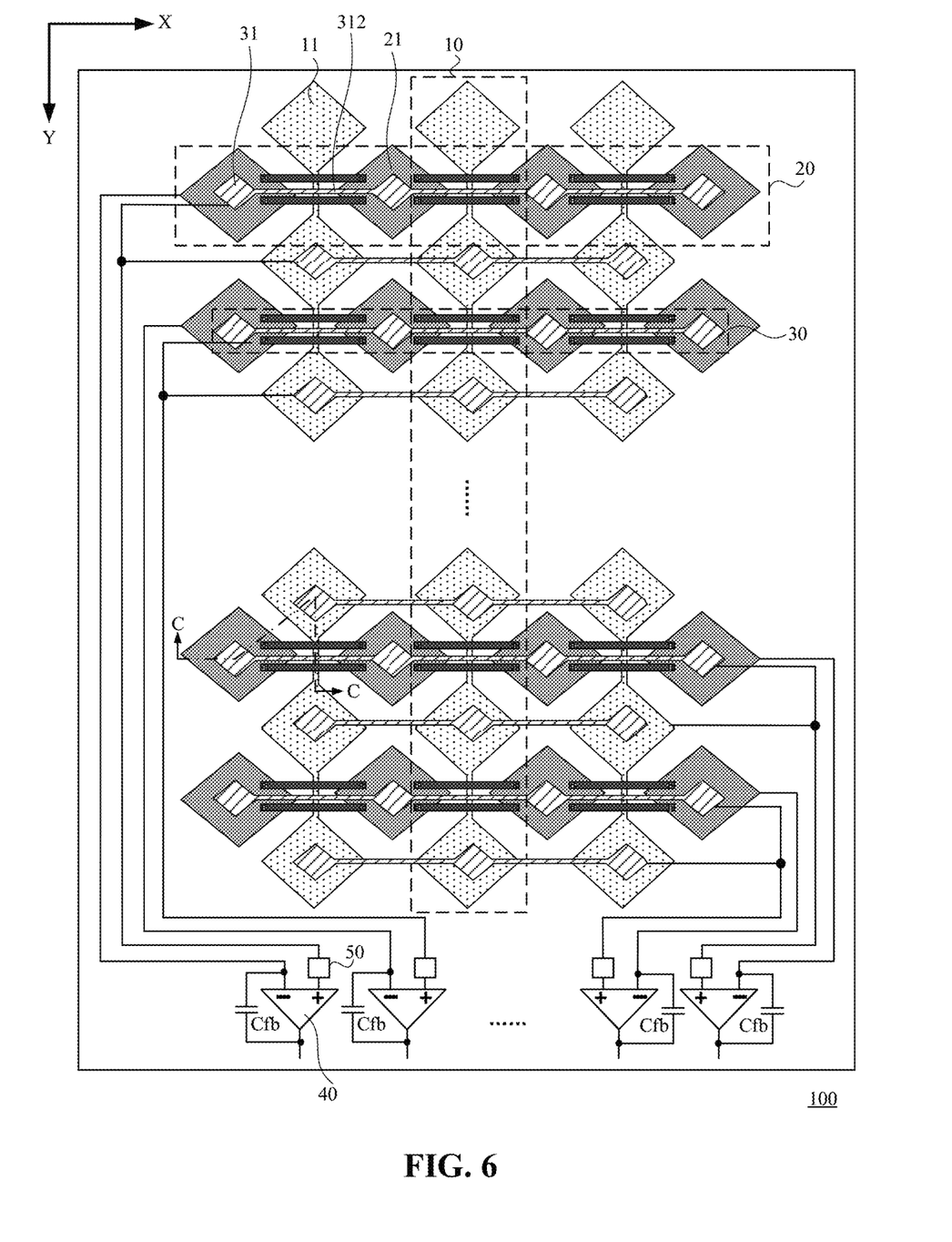
FIG. 6 shows a schematic top view of yet another structure of a touch display panel provided by the embodiments of the application.
Figure 7:
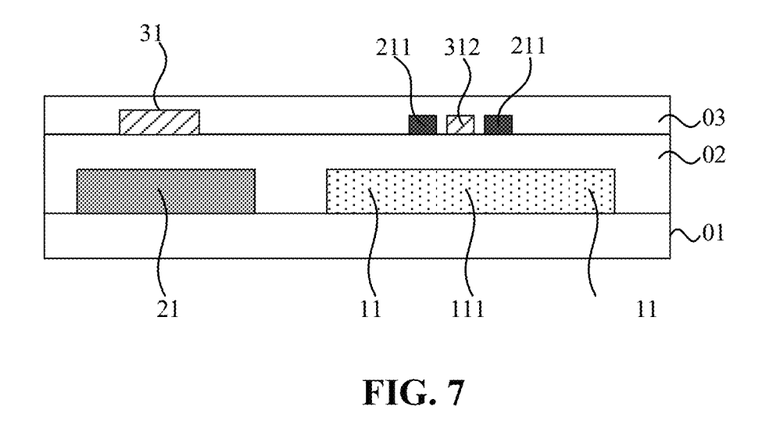
FIG. 7 shows a schematic cross-section view along C-C of the structure in FIG. 6.

In some alternative embodiments, please refer to FIG. 6 and FIG. 7, the drive electrodes 11 and the induction electrodes 21 may be located in the same film layer, the detection electrodes 31 may be located in a film layer different from that of the drive electrodes 11 and the induction electrodes 21, and an orthographic projection of at least one of detection electrodes 31 on the touch display panel overlaps with an orthographic projection of a drive electrode 11 on the touch display panel, and an orthographic projection of at least another one of the detection electrodes 31 on the touch display panel overlaps with an orthographic projection of an induction electrode 21 on the touch display panel.

As an example, as shown in FIG. 7, the detection electrodes 31 may be located on a side of the drive electrodes 11 and the induction electrodes 21 facing away from the substrate 01. A plurality of detection electrodes 31 in the same detection channel 30 may be connected through connection lines 312. The connecting lines 312 may be located on the same film layer as the detection electrodes 31. Obviously, the detection electrodes 31 may also be located on a side of the drive electrodes 11 and the induction electrodes 21 facing with the substrate 01.

Since the detection electrode 31 does not need to recognize the touch signal, as shown in FIG. 6, the cross-sectional area of the detection electrode 31 is smaller than the cross-sectional area of the drive electrode 11, and the cross-sectional area of the detection electrode 31 is smaller than the cross-sectional area of the induction electrode 21.

Here, the cross-sectional area of the induction electrode 21 may also be the area of the cross-section of the induction electrode 21 parallel to the light-emitting surface of the touch display panel, the cross-sectional area of the detecting electrode 31 may be the area of the cross-section of the detecting electrode 31 parallel to the light-emitting surface of the touch display panel, and the cross-sectional area of the drive electrode 11 may be the area of the cross-section of the drive electrode 11 parallel to the light-emitting surface of the touch display panel.

For example, as shown in FIG. 6, the cross-section of the induction electrode 21 parallel to the light-emitting surface of the touch display panel may be a rhombus, and the cross-sectional area of the induction electrode 21 may be an area of the rhombus corresponding to the induction electrode 21. The cross-section of the detection electrode 31 parallel to the light-emitting surface of the touch display panel may also be a rhombus, and the cross-sectional area of the detection electrode 31 may be an area of the rhombus corresponding to the detection electrode 31. The cross section of the drive electrode 11 parallel to the light-emitting surface of the touch display panel may also be a rhombus, and the cross-sectional area of the drive electrode 11 may be an area of the rhombus corresponding to the drive electrode 11.

Figure 8:
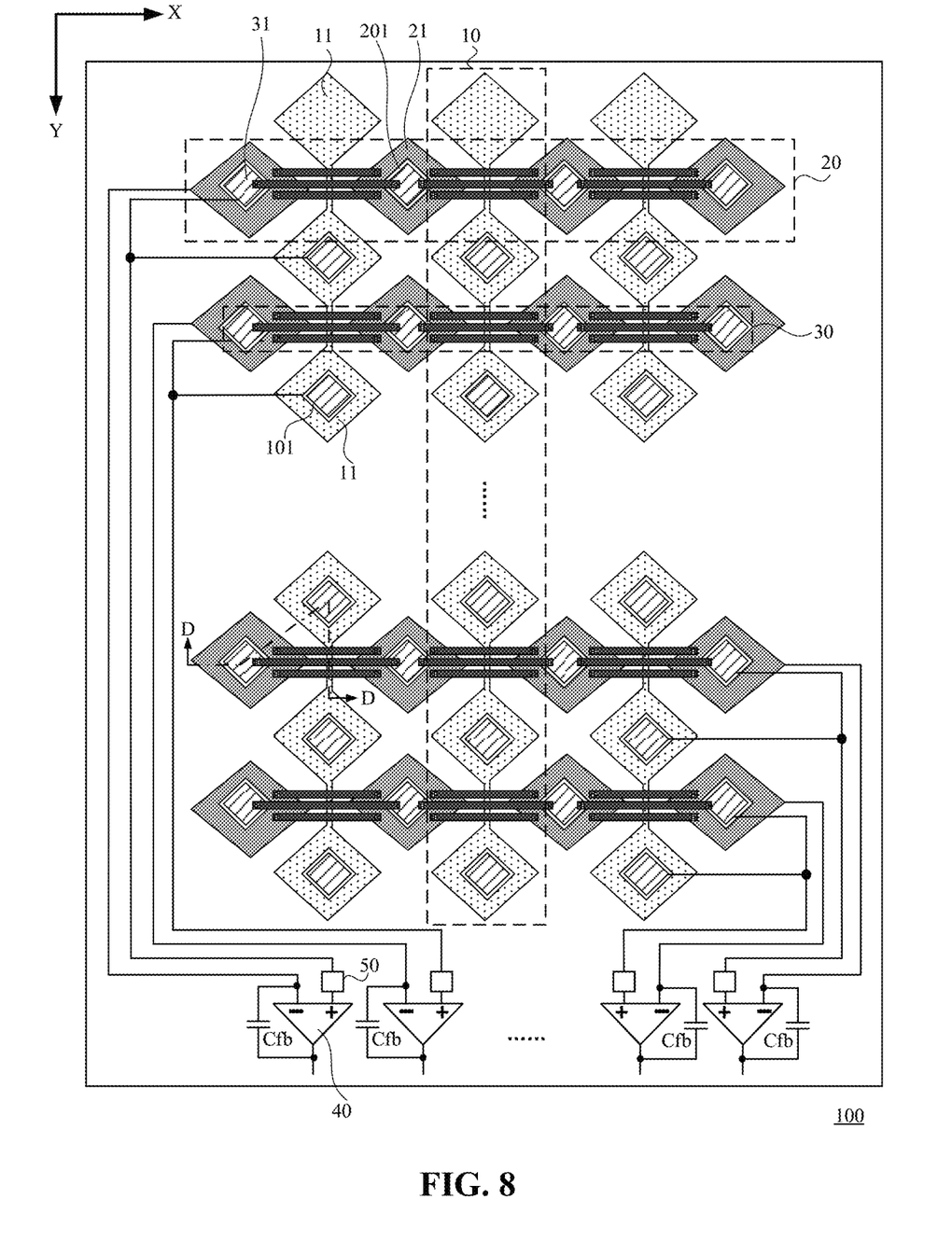
FIG. 8 shows a schematic top view of yet another structure of a touch display panel provided by the embodiments of the application.
Figure 9:
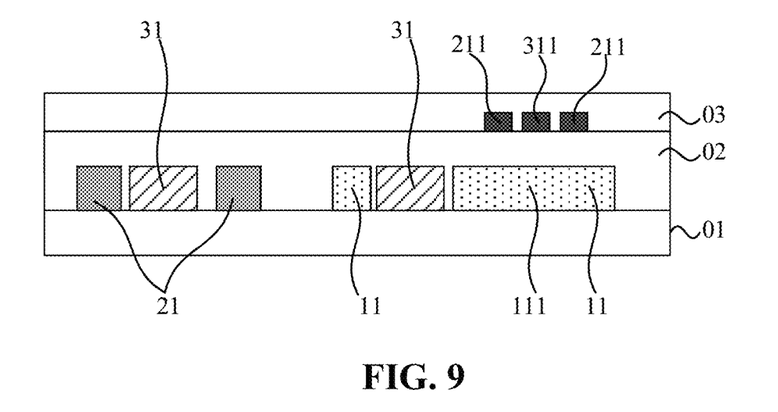
FIG. 9 shows a schematic cross-section view along D-D of the structure in FIG. 8.

In some alternative embodiments, please refer to FIG. 8 and FIG. 9, the drive electrode 11, the induction electrode 21 and the detection electrode 31 are located in the same film layer. The drive electrode 11 may include a second hollow area 101, the induction electrode 21 may include a third hollow area 201, at least one detection electrode 31 may be located in the second hollow area 101 of the drive electrode 11, and at least another one detection electrode 31 may be located in the third hollow area 201 of the induction electrode 21. In other words, at least one detection electrode 31 may be surrounded by the drive electrode 11, and at least another one detection electrode 31 may be surrounded by the induction electrode 21.

As an example, as shown in FIG. 9, a plurality of detection electrodes 31 in the same detection channel 30 may be connected through the first bridge structure 311. A plurality of induction electrodes 21 in the same induction channel 20 may be connected through the first bridge structure 312. The first bridge structure 311 and the first bridge structure 312 are located on a side of the drive electrode 11, the induction electrode 21, and the detection electrode 31 away from the substrate 01.

In FIG. 6 and FIG. 8, for example, the number of detection channels 30 is greater than the number of induction channels 20, and the number of operational amplifiers 40 may be equal to the number of induction channels 20. A plurality of detection channels 30 may be connected with a same operational amplifier 40. For example, the number of detection channels 30 is twice the number of induction channels 20, and each two adjacent detection channels 30 may be connected with a same operational amplifier 40. For example, the $i^{th}$ induction channel 20 may be connected with the first input terminal of the $i^{th}$ operational amplifier 40, the $j^{th}$ detection channel 30 overlaps with the $i^{th}$ induction channel 20, and the $j^{th}$ detection channel 30 and (j+1)th detection channel 30 may be connected with the second input terminal of the $i^{th}$ operational amplifier 40.

It should be noted that the position, the area and the number of the detection electrode 31 in the embodiments of the application are only illustrative, and the detection electrode may be arranged according to the actual needs. For example, the detection electrode may be arranged according to degrees of the interference signals in different areas. In the area with higher degree of interference signal, more detection electrodes 31 may be arranged; and in the area with lower degree of interference signal, less detection electrodes 31 may be arranged or even no detection electrode 31 may be arranged. Obviously, the plurality of detection electrodes 31 may also be uniformly distributed.

In some alternative embodiments, the detection electrode 31 may be time-divisionally reused as a crack detection electrode. The detection electrode 31 may be reused as the crack detection electrode in a detection stage; and in a touch recognition stage, for example, the detection electrode 31 induces the interference signal to improve the accuracy of the touch recognition. For example, a plurality of detection electrodes 31 are connected with one another to constitute a detection channel 30, and a resistance value of the detection channel 30 may be measured at the detection stage. If the detection channel 30 is intact and continuous without disconnection, a certain resistance value may be measured on the detection channel 30; and when the touch display panel is cracked and the detection channel 30 is broken at a crack position, the resistance value of the detection channel 30 measured may be increased. Therefore, by measuring the change on the resistance value of the detection channel 30, whether the detection channel 30 has a crack may be detected, and then whether the touch display panel has a crack may be obtained, and a crack detection is realized.

Figure 10:
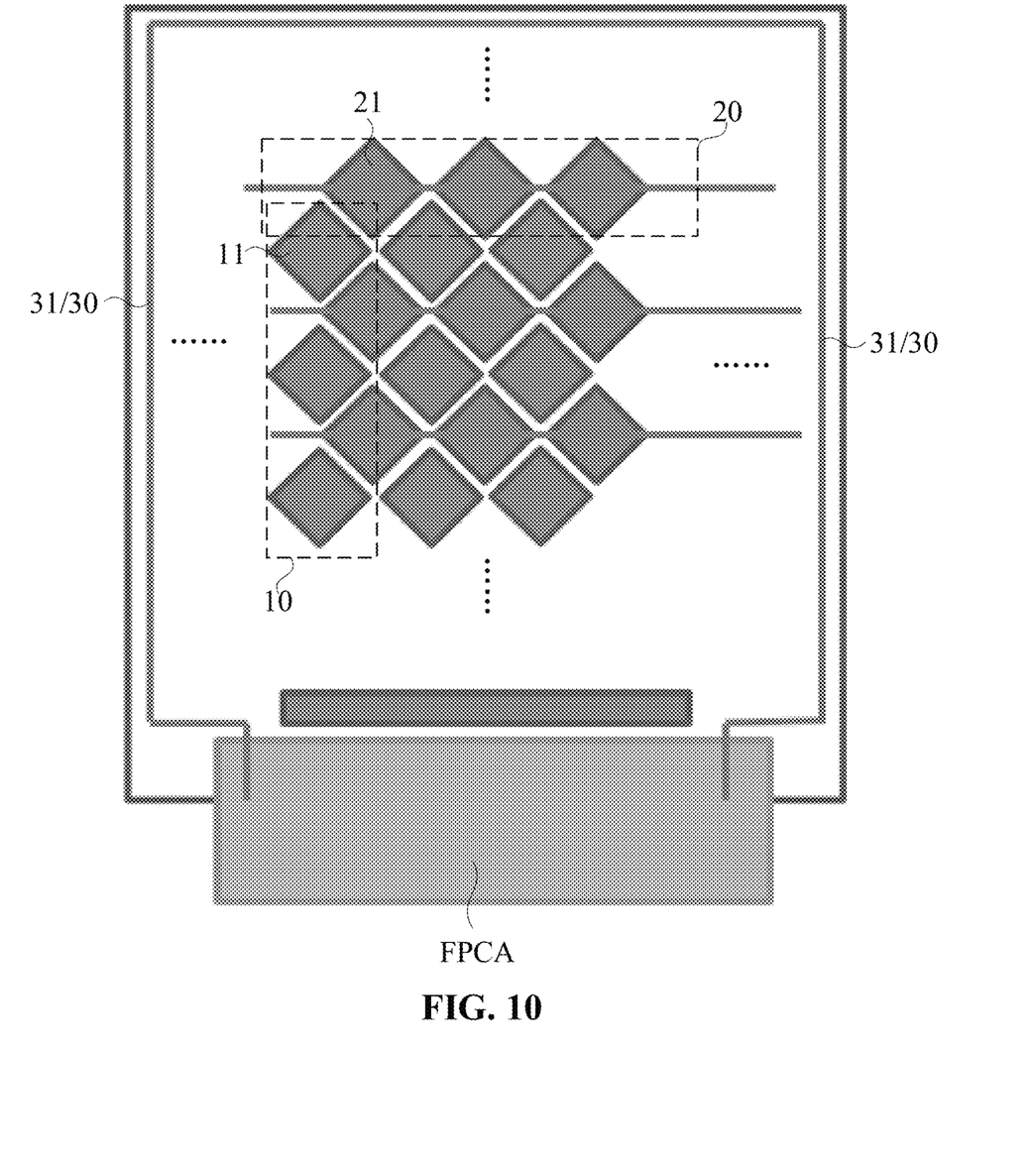
FIG. 10 shows a schematic top view of yet another structure of a touch display panel provided by the embodiments of the application.

In other embodiments, as shown in FIG. 10, the position of the detection electrode 31 is close to the positions of lines connecting with the drive channel 10 or the induction channel 20 (not shown in the figure). Therefore, the detection electrode 31 may be time-divisionally reused as the crack detection electrode to detect whether there is a crack in the lines connecting with the drive channel 10 and the induction channel 20. It should be understood that the structure shown in FIG. 10 does not need to change the structure of the drive electrode 11 and the induction electrode 21, and there will be no mutual capacitance between the detection electrode 31 and the drive electrode 11 in the touch stage. The detection electrode 31, the drive electrode 11 and the induction electrode 21 may be located in the same film layer. After the drive electrode 11 is driven, mutual capacitance is formed between the induction electrode 21 and the drive electrode 11. The signal detected by the detection electrode 31 and the signal detected by the induction electrode 21 are differentiated to obtain the touch induction signal, which is beneficial to the implementation of reducing interference signal.

As an example, the terminal of the detection electrode 31 may be connected with a flexible circuit board (FPCA) to facilitate crack detection.

Figure 11:
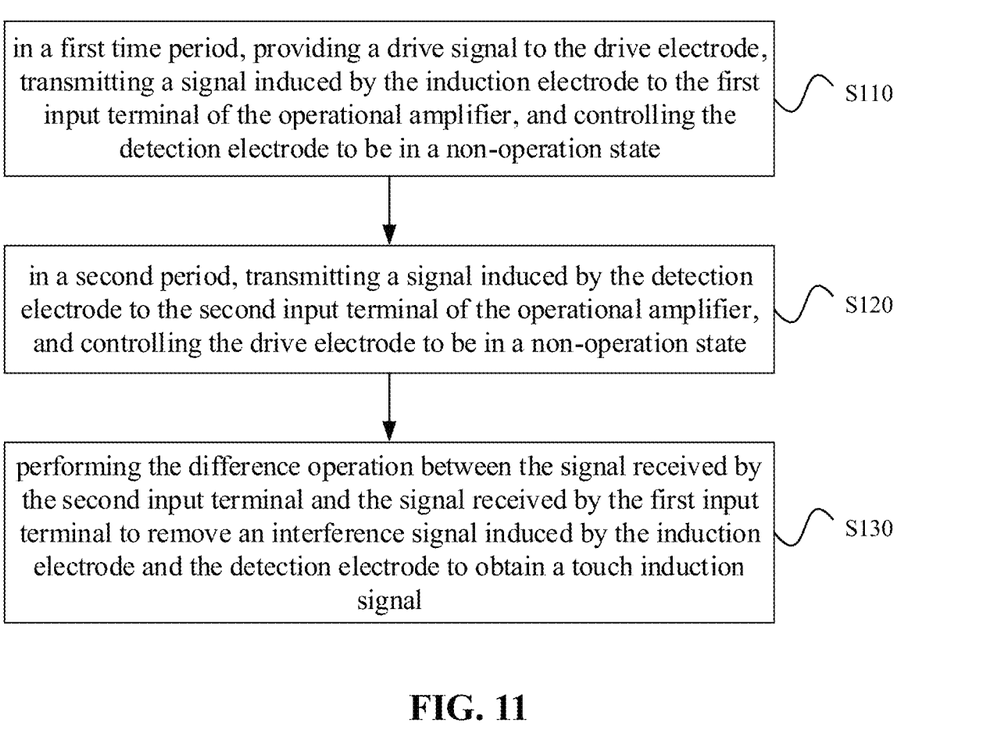
FIG. 11 shows a schematic flow diagram of a drive method for the touch display panel provided by the embodiments of the present application.

Based on the same inventive concept, the embodiments of the application further provides a drive method of the touch display panel of any of the above embodiments. As shown in FIG. 11, the drive method of the touch display panel provided by the embodiments of the application may include S110 to S130.

In S110, in a first time period, a drive signal is provided to the drive electrode, a signal induced by the induction electrode is transmitted to the first input terminal of the operational amplifier, and the detection electrode is controlled to be in a non-operation state.

In S120, in a second period, a signal induced by the detection electrode is transmitted to the second input terminal of the operational amplifier, and the drive electrode is controlled to be in a non-operation state.

In S130, the difference operation between the signal received by the second input terminal and the signal received by the first input terminal is performed to remove an interference signal induced by the induction electrode and the detection electrode to obtain a touch induction signal.

The specific implementation of the above steps will be described in detail below.

According to the drive method of the touch display panel provided by the embodiments of the application, a mutual capacitance may be formed between the induction electrode and the drive electrode, and the signal induced by the induction electrode may include a touch signal and an interference signal. The detection electrode and the drive electrode may operate in different time periods, and a mutual capacitance may not be formed between the detection electrode and the drive electrode, so that a signal induced by the detection electrode includes an interference signal and does not include a touch signal. The signal induced by the induction electrode is transmitted to the first input terminal of the operational amplifier, and the signal induced by the detection electrode is transmitted to the second input terminal of the operational amplifier. The operational amplifier performs the difference operation between the signal received by the second input terminal and the signal received by the first input terminal, which may remove the common interference signal between the signal induced by the induction electrode and the signal induced by the detection electrode, and is beneficial to improve the accuracy of touch recognition.

For example, as shown in FIG. 1, the touch display panel may include a plurality of drive channels 10 and a plurality of induction channels 20. The plurality of drive electrodes 11 in each drive channel 10 are connected with one another, and the plurality of induction electrodes 21 in each induction channel 20 are connected with one another. In S110, in the first time period, drive signals may be provided to the plurality of drive channels 10 successively, and each induction electrode 21 transmits the induced capacitance to the first input terminal of the operational amplifier.

If the detection electrode is also in an operation state in the first time period, there will be mutual capacitance between the detection electrode and the drive electrode, resulting in that the signal induced by the detection electrode includes not only the interference signal but also the touch signal, so that the operational amplifier will not only remove the interference signal jointly induced by the induction electrode and the detection electrode, but also remove the touch signal jointly induced by the induction electrode and the detection electrode, which may lead to a situation that it is impossible to detect whether a touch occurs or to accurately recognize the touch position information. In the first time period, by making the drive electrode and the induction electrode in the operation state, and making the induction electrode in the non-operation state, it may be ensured that there is no mutual capacitance between the detection electrode and the drive electrode, so that the capacitance value of the induction electrode may be used for determining whether touch occurs and its position information.

In some alternative embodiments, in S110, controlling the detection electrode to be in the non-operation state may include: controlling the detection electrode to be in a grounded state; controlling the detection electrode to be in a high resistance state; or applying a DC voltage on the detection electrode.

As an example, the detection electrode may be connected with a grounded terminal of the touch display panel in the first time period, so as to control the detection electrode in the grounded state.

As an example, the detection electrode may be arranged to be in a floating state in the first time period to control the detection electrode to be in the high resistance state.

Similarly, if the drive electrode is also in the operation state in the second time period, there will also be mutual capacitance between the detection electrode and the drive electrode, resulting in that the signal induced by the detection electrode includes not only the interference signal but also the touch signal, so that the operational amplifier will not only remove the interference signal jointly induced by the induction electrode and the detection electrode, but also remove the touch signal jointly induced by the induction electrode and the detection electrode, which may lead to the situation that it is impossible to detect whether the touch occurs or to accurately recognize the touch position information. In the second time period, by making the detection electrode in the operation state, and making the drive electrode in the non-operation state, it may be ensured that there is no mutual capacitance between the detection electrode and the drive electrode, so that the capacitance value of the induction electrode may be used for determining whether touch occurs and its position information.

In some alternative embodiments, in S110, controlling the drive electrode to be in the non-operation state may specifically include: controlling the drive electrode to be in a grounded state; or controlling the drive electrode to be in a high resistance state.

Similarly, the drive electrode may be connected with the grounded terminal of the touch display panel in the second time period, so as to control the drive electrode to be in the grounded state.

As an example, the drive electrode may be arranged to be in the floating state in the second time period, so as to control the drive electrode to be in the high resistance state.

In some alternative embodiments, the drive method provided by the embodiments of the present application may further include: arranging the first time period and the time second period alternately.

A touch frame may include a first time period and a second time period. By arranging the first period and the second period alternately, the interference signal may be removed for each touch recognition.

As an example, a touch recognition drive and a display drive may be performed in a way of asynchronous drive. In other words, a touch frame and a display frame may be asynchronous, such that a processing of touch detection data may be completed by an algorithm executed by a processing circuit during the display frame.

According to the embodiments described above in the application, the embodiments do not describe all details in detail, nor limit the application to the specific embodiments described. Obviously, according to the above description, many modifications and changes may be made. These embodiments are selected and described in detail in this description in order to better explain the principle and practical use of this application, so that those skilled in the art may make good use of this application and the modifications based on the application. The application is only limited by the claims and their full scope and equivalents.

What is claimed is:

1. A touch display panel comprising a drive electrode, an induction electrode, a detection electrode and an operational amplifier, wherein the induction electrode is electrically connected with a first input terminal of the operational amplifier, and the detection electrode is electrically connected with a second input terminal of the operational amplifier, and wherein the operational amplifier is configured to perform a difference operation between a signal received by the second input terminal and a signal received by the first input terminal, wherein the touch display panel further comprises a gain adjustment unit connected between the detection electrode and the second input terminal, and wherein the gain adjustment unit is configured to adjust a signal induced by the detection electrode according to a difference between a cross-sectional area of the induction electrode and a cross-sectional area of the detection electrode.

2. The touch display panel according to claim 1, wherein the touch display panel further comprises a first capacitor, a first electrode of the first capacitor is connected with the first input terminal, and a second electrode of the first capacitor is connected with an output terminal of the operational amplifier.

3. The touch display panel according to claim 1, wherein a plurality of drive electrodes constitute a plurality of drive channels, and a plurality of drive electrodes of each drive channel are connected with one another;

a plurality of induction electrodes constitute a plurality of induction channels, a plurality of induction electrodes of each induction channel are connected with one another, and the induction channels intersect with the drive channels; and a plurality of detection electrodes constitute a plurality of detection channels, a plurality of detection electrodes of each detection channel are connected with one another, and the detection channels intersect with the drive channels.

4. The touch display panel according to claim 3, wherein the drive electrodes, the induction electrodes and the detection electrodes are located in a same film layer.

5. The touch display panel according to claim 4, wherein the plurality of detection electrodes of a same detection channel are connected through a first bridge structure; and electrodes of at least one of the drive channel and the induction channel are connected through at least one second bridge structure.

6. The touch display panel according to claim 5, wherein an extension direction of the first bridge structure is the same as an extension direction of the second bridge structure.

7. The touch display panel according to claim 5, wherein the electrodes of at least one of the drive channel and the induction channel are connected through two second bridge structures, and the first bridge structure is between the two second bridge structures.

8. The touch display panel according to claim 4, wherein at least one of the induction channels is correspondingly provided with a detection channel, each detection electrode comprises a first hollow area, and each induction electrode is located in the first hollow area of a corresponding detection electrode.

9. The touch display panel according to claim 3, wherein the drive electrodes and the induction electrodes are located in a same film layer, the detection electrodes are located in a film layer different from that of the drive electrodes and the induction electrodes, and an orthographic projection of at least one of the detection electrodes on the touch display panel overlaps with an orthographic projection of a drive electrode on the touch display panel, and an orthographic projection of at least another one of the detection electrodes on the touch display panel overlaps with an orthographic projection of an induction electrode on the touch display panel.

10. The touch display panel according to claim 9, wherein a cross-sectional area of each detection electrode is smaller than a cross-sectional area of each drive electrode, and the cross-sectional area of each detection electrode is smaller than a cross-sectional area of each induction electrode.

11. The touch display panel according to claim 1, wherein the drive electrode, the induction electrode and the detection electrode are located in a same film layer, the drive electrode comprises a second hollow area, the induction electrode comprises a third hollow area, at least one detection electrode is located in the second hollow area, and at least another one detection electrode is located in the third hollow area.

12. The touch display panel according to claim 1, wherein the detection electrode is time-divisionally reused as a crack detection electrode.

13. The touch display panel according to claim 1, wherein each of the signal received by the first input terminal and the signal received by the second input terminal comprises an interference signal caused by display.

14. The touch display panel according to claim 13, wherein the interference signal caused by the display comprises one or more of an interference signal generated by an operation of a switching element in a display area of the touch display panel, an interference signal generated by an operation of a switching element in a drive chip of the touch display panel, and an interference signal generated by a load difference among signal routings of the touch display panel.

15. The touch display panel according to claim 1, wherein a cross-sectional area of the induction electrode is larger than a cross-sectional area of the detection electrode, and the gain adjustment unit is configured to increase a signal induced by the detection electrode; or the cross-sectional area of the induction electrode is smaller than the cross-sectional area of the detection electrode, and the gain adjustment unit is configured to reduce the signal induced by the detection electrode.

16. A drive method for touch display panel, wherein the display panel comprises a drive electrode, an induction electrode, a detection electrode and an operational amplifier, wherein the induction electrode is electrically connected with a first input terminal of the operational amplifier, and the detection electrode is electrically connected with a second input terminal of the operational amplifier, and wherein the operational amplifier is configured to perform a difference operation between a signal received by the second input terminal and a signal received by the first input terminal, wherein the method comprises:

in a first time period, controlling the drive electrode to be in an operation state, providing a drive signal to the drive electrode, transmitting a signal induced by the induction electrode to the first input terminal of the operational amplifier, and controlling the detection electrode to be in a non-operation state, wherein the signal induced by the induction electrode includes a touch induction signal and an interference signal;

in a second period, controlling the detection electrode to be in an operation state, transmitting a signal induced by the detection electrode to the second input terminal of the operational amplifier, and controlling the drive electrode to be in a non-operation state, wherein the signal induced by the detection electrode includes merely the interference signal; and performing the difference operation between the signal received by the second input terminal and the signal received by the first input terminal to remove the interference signal induced by the induction electrode and the detection electrode to obtain the touch induction signal, wherein the first time period and the time second period are arranged alternately.

17. The drive method according to claim 16, wherein controlling the detection electrode to be in the non-operation state comprises:

controlling the detection electrode to be in a grounded state;

controlling the detection electrode to be in a high resistance state; or applying a DC voltage on the detection electrode.

18. The drive method according to claim 17, wherein controlling the drive electrode to be in the non-operation state comprises:

controlling the drive electrode to be in a grounded state; or controlling the drive electrode to be in a high resistance state.

* * * * *